Nov. 14, 1933.        G. H. LELAND        1,935,455
AUTOMATIC SWITCH OPERATING MECHANISM
Filed Nov. 16, 1931
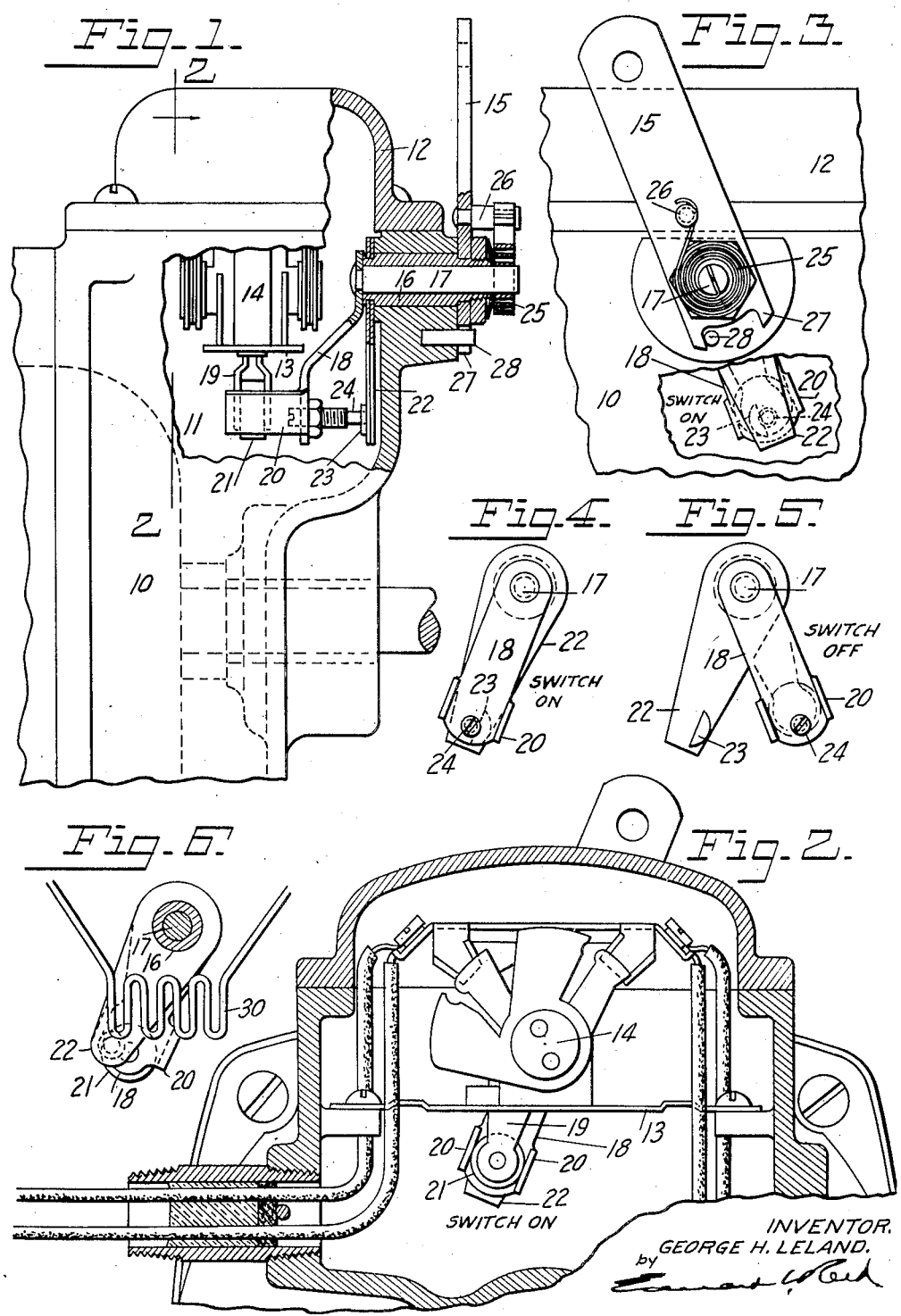
INVENTOR.
GEORGE H. LELAND.
by
his ATTORNEY.

Patented Nov. 14, 1933

1,935,455

UNITED STATES PATENT OFFICE 1,935,455

AUTOMATIC SWITCH OPERATING MECHANISM

George H. Leland, Dayton, Ohio, assignor of one-half to The Leland Electric Company, Dayton, Ohio, a corporation of Ohio Application November 16, 1931
Serial No. 575,323

16 Claims. (Cl. 200—138)

This invention relates to an automatic switch operating mechanism and is designed more particularly to interrupt the operation of a motor when the temperature within the motor casing becomes excessive.

One object of the invention is to provide a switch operating mechanism by means of which the switch may be normally operated in the usual manner and which will automatically operate the switch upon the appearance of abnormal temperature conditions.

A further object of the invention is to provide such a mechanism which is adapted to operate a switch mounted within the sealed casing of a motor.

A further object of the invention is to provide such a mechanism which will be simple in construction and reliable in operation.

Other objects of the invention will appear as the mechanism is described in detail.

In the accompanying drawing Fig. 1 is an elevation of a portion of a motor casing, partly in section, to show the switch operating mechanism mounted therein; Fig. 2 is a section taken on the line 2—2 of Fig. 1, looking in the direction of the arrows; Fig. 3 is an end elevation of a portion of the motor casing, partly broken away, and showing the operating mechanism thereon; Fig. 4 is a detail view showing the actuating member and thermal elements in their normal positions; Fig. 5 is a similar view showing the positions of the actuating member and thermal element when the switch has been automatically operated; and Fig. 6 is a detail view showing a slight modification of the invention.

In the drawing I have illustrated one embodiment of my invention and have shown the same as mounted in a sealed casing in an electric motor but it will be understood that this particular embodiment has been chosen for the purposes of illustration only and that the invention may take various forms and may be used for various purposes.

When electric motors are to be operated in the presence of explosive gases, for example for operating a gasoline pump, it is customary to provide the motor with a sealed casing and to mount the motor switch within a sealed chamber, which chamber is often arranged within the motor casing, and I have here illustrated the switch operating mechanism as applied to such a sealed motor casing. One end of the motor casing is shown at 10 and is provided in its upper portion with a chamber 11 to receive the switch and its controlling mechanism. In the present instance, the upper end of the chamber 11 is closed by a dome-shaped cap 12, and the switch is preferably supported within the chamber beneath the cap and extends into the same. As here shown, the switch is mounted on a bar 13 supported by the side walls of the casing. The switch may be of any suitable character and, as here shown, at 14, has a snap action. The switch being of a well known type it is not necessary to illustrate or describe the same in detail. Mounted exteriorly of the casing 10 is a switch operating device which, in the present instance, comprises a lever 15 pivotally mounted on the casing and which may be either grasped by the hand of the operator to throw the switch or may be connected with an actuating device mounted at a point remote from the motor. This switch operating device is so connected with the switch that the latter may be normally operated thereby in the usual manner but the connection between the operating device and the switch is controlled by a temperature controlled device which will interrupt the connection upon the occurrence of abnormal temperature conditions and thus permit the switch to be operated independently of the operating device, suitable means being provided for so operating the switch.

In the particular construction here illustrated the operating device or lever 15 is rigidly secured to the outer end of a tubular shaft 16 which is journaled in the end wall of a motor casing and extends into the chamber 11. Mounted within the tubular shaft 16 is a second shaft 17 which extends beyond both ends of the tubular shaft. Rigidly secured to the inner end of the second shaft 17 is an actuating member 18 which may be operatively connected with the switch in any suitable manner. The present switch has a swinging arm 19 for imparting movement thereto and I have provided the actuating member 18 with spaced lugs 20 arranged to receive the arm 19 between them and thus cause the arm to move with the actuating member. Preferably the arm is provided with a roller 21 to engage the lugs 20 and reduce the frictional contact between these parts. Rigidly secured to the inner end of the tubular shaft 16 is a thermal element such as a bimetallic bar 22. The bar 22 and the actuating member 18 have interengaging parts which will cause the actuating member and the bar to move normally in unison but which parts may be separated by the action of the thermostatic bar to release the actuating member for movement relatively to the bar. In the present construction, the thermostatic bar 22 is provided with a lug or latch member 23 adapted to engage a stud 24 carried by the actuating member 18. When the thermostatic bar is in its normal position the stud 24 will bear against the latch 23 and the actuating member will be held against movement past the thermostatic bar. Under abnormal heat conditions the thermostatic bar will flex and move the latch 23 out of the path of stud 24, thus disconnecting the actuating member from the bar. Preferably the latch 23 has an inclined surface so arranged that when the thermostatic bar has assumed its normal position the latch may be forced past the stud 24 and caused to again engage the same, the bar yielding to permit the latch to pass the stud. Spring means act on the actuating member 18 and the thermostatic bar 22 to move the same in opposite directions, the relative movement of the actuating member and the bar being normally prevented by the latch 23 and stud 24. As here shown, the spring 25 is coiled about the outer end of the shaft 17 and has its inner end secured to that shaft and has its outer end in engagement with the stud 26 on the operating lever 15. The arrangement of this spring is such that it will tend to move the two shafts and consequently the actuating member to the thermostatic bar in opposite directions and will hold the stud 24 of the actuating member normally in engagement with the latch 23 of the thermostatic bar. Consequently when the operating lever is moved in one direction the engagement of the latch with the stud 24 will cause the actuating member to move with the thermostatic bar and when the operating lever is moved in the other direction the spring will cause the actuating member to follow the movement of the thermostatic bar and will maintain the interengaging parts in engagement. The operating lever 15 is provided with spaced lugs 27 between which is arranged a stop pin 28 mounted in the motor casing and which serves to limit the movement of the lever. When the operating mechanism is in the position shown in Fig. 3 the switch will be closed and the motor in operation. Should the temperatures in the motor casing become excessive the thermostatic bar will be flexed to disconnect the actuating member 18 therefrom and inasmuch as the operating lever is then held against movement by the spring, by the stop 28, the spring will act to move the actuating member 18 past the thermostatic bar to the position shown in Fig. 5, thereby causing the switch to be opened and stopping the motor. The connection between the operating lever and the actuating member cannot be reestablished until the temperatures in the casing have returned to normal. When the thermostatic bar is again in its normal position the movement of the lever 15 to the position which it occupies when the switch is opened will cause the latch 23 to again engage the stud 24 and thus reestablish the connection between the thermostatic bar and the actuating member. As has been stated, the operating mechanism is not limited to use with a sealed motor casing as here shown but may be used for various purposes and in Fig. 6 I have shown a slightly modified form of the mechanism in which the thermal element is provided with means for heating the same, this means being preferably in the form of a heating coil 30 arranged adjacent to the thermal element and connected in the switch circuit, so that an excessive flow of current will cause the thermal element to be actuated, thus causing the switch to be opened.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a switch operating mechanism, a shaft, an actuating member rigidly secured to said shaft and connected with the switch, an operating member mounted for movement about the axis of said shaft, a spring connecting said operating device with said shaft and tending to move said operating device and said actuating member in opposite directions, means to limit the movement of said operating device by said spring, and means including a thermal element to connect said actuating member with said operating device and cause said parts to normally move in unison and to release said actuating member for movement by said spring.

2. In a switch operating mechanism, a shaft, an actuating member rigidly secured to said shaft and connected with the switch, an operating member mounted for movement about the axis of said shaft, a spring connecting said operating device with said shaft and tending to move said operating device and said actuating member in opposite directions, a thermal element connected with said operating device for movement therewith, said thermal element and said actuating member having interengaging parts to cause the same to move in unison and arranged to be separated by the action of said thermal element and thereby release said actuating member for movement by said spring.

3. In a switch operating mechanism, a tubular shaft, an operating device connected with said shaft, a second shaft rotatably mounted in said tubular shaft, a spring connected with said second shaft and said operating device and tending to move the same in opposite directions, an actuating member secured to said second shaft and having means for connecting the same with a switch to be operated, and a thermal element connected with said tubular shaft, said actuating member and said thermal element having interengaging parts to cause the same to move normally in unison and arranged to be separated by the action of said thermal element to release said actuating member for movement independently of said thermal element.

4. In a switch operating mechanism, a tubular shaft, an operating device connected with said shaft, a second shaft rotatably mounted in said tubular shaft, a spring connected with said second shaft and said operating device and tending to move the same in opposite directions, an actuating member secured to said second shaft and having means for connecting the same with a switch to be operated, a thermal element connected with said tubular shaft, said thermal element having a part forming a latch, a stud carried by said actuating member and arranged to be held normally in engagement with said latch by the action of said spring, said latch being so arranged that it will be moved out of the path of said stud when said thermal element is actuated by a change in temperature.

5. In a switch operating mechanism, an actuating member and a thermostatic bar mounted separately from the switch for pivotal movement about a common axis, an operating device connected with said bar, spring means tending to move said actuating member and said bar in opposite directions about said axis, and means to limit the movement of said bar by said spring, said actuating member and said bar having interengaging parts to cause the same to normally move in unison and arranged to be separated by the thermostatic action of said bar and thereby release said actuating member for movement by said spring.

6. In a device of the character described, the combination with a closed casing and a switch mounted within said casing, of a switch operating device mounted exteriorly of said casing, means comprising a thermostatic element arranged within said casing to normally connect said operating device with said switch and to interrupt said connection when the atmospheric temperature in said casing rises to a predetermined degree, and means acting on said switch to open the same when said connection is interrupted.

7. In a device of the character described, the combination with a closed casing and a switch mounted in said casing, of an actuating member mounted within said casing and connected with said switch, a switch operating device mounted exteriorly of said casing, spring means acting on said actuating member and said operating device to move the same in opposite directions, and means including a thermal element to normally prevent the relative movement of said actuating member and said operating device and to cause said parts to move in unison, said thermal element being so arranged that upon a predetermined rise in atmospheric temperature within said casing it will release said actuating member for movement by said spring means.

8. In a device of the character described, the combination with a closed casing and a switch mounted within said casing, of a tubular shaft mounted in the wall of said casing, a second shaft mounted within said tubular shaft, a spring acting on said shafts to rotate the same in opposite directions, an actuating member secured to the inner end of said second shaft and connected with said switch, a thermostatic bar secured to the inner end of said tubular shaft, said actuating member and said bar having interengaging parts arranged to normally prevent the relative movement of said actuating member and said bar and to release said actuating member from said bar when the latter is actuated by a rise in atmospheric temperature within said casing, and an operating device connected with the outer portion of said tubular shaft.

9. In combination with a switch, an operating device separate from said switch to open and close the same in the normal operation thereof, means including a thermal element controlled by atmospheric temperature for normally connecting said operating device with said switch, and means acting on said switch to move the same in one direction when said connection is interrupted.

10. In combination with a switch, an operating device separate from said switch to open and close the same in the normal operation thereof, means including a thermal element controlled by atmospheric temperature for normally connecting said operating device with said switch and for interrupting said connection upon the occurrence of a predetermined change in atmospheric temperature, and spring means to operate said switch when said connection has been interrupted.

11. In combination with a switch, an operating device separate from said switch to open and close the same in the normal operation thereof, means including a thermal element controlled by atmospheric temperature for normally connecting said operating device with said switch and for interrupting said connection upon the occurrence of a predetermined change in atmospheric temperature, and a spring connected with said operating device and acting on said switch to move the same independently of said operating device when the first mentioned connection is interrupted.

12. In combination with a switch having a movable member, an operating device, a spring connected with said operating device and with said movable member and tending to move said movable member in one direction independently of said operating device, and releasable means for causing said movable member to normally move with said operating device in both directions, said means including a thermal element independent of the switch circuit and controlled solely by atmospheric temperature to release said movable member for movement by said spring.

13. In combination with a switch having a movable member, an actuating member separate from and operatively connected with said movable member to open and close said switch, a device for operating said actuating member in the normal operation of said switch, means controlled by atmospheric temperature adjacent to said switch for normally maintaining an operative connection between said operating device and said actuating member, and means for operating said actuating member independently of said operating device when said connection has been interrupted.

14. In combination with a switch having a movable member, an actuating member separate from and operatively connected with said movable member to open and close said switch, spring means tending to move said actuating member in one direction, a temperature controlled device to control the movement of said actuating member by said spring means, and means for moving said actuating member and said temperature controlled device in unison in the normal operation of said switch.

15. In combination with a switch having a movable member, an actuating member separate from and operatively connected with said movable member to open and close said switch, spring means tending to move said actuating member in one direction, an operating device, and means including a thermal element for connecting said operating device with said actuating member and causing said parts to move normally in unison, said thermal element being operable by a change in atmospheric temperature to interrupt said connection and release said actuating member for movement relatively to said operating device by said spring means.

16. In combination with a switch having a movable member, an actuating member separate from and operatively connected with said movable member to open and close said switch, an operating device, spring means acting on said actuating member and said operating device to move the same in opposite directions, means including a thermal element for connecting said actuating member with said operating device and causing said parts to normally move in unison, and means for limiting the movement of said operating device and causing said spring to operate said actuating member when said connection is interrupted by said thermal element.

GEORGE H. LELAND.